United States Patent [19]
Gibo

[11] Patent Number: 5,085,823
[45] Date of Patent: Feb. 4, 1992

[54] LATCH ASSEMBLY FOR A CONTROL ROD DRIVE

[75] Inventor: Edward Y. Gibo, San Jose, Calif.

[73] Assignee: General Electric Company, San Jose, Calif.

[21] Appl. No.: 664,740

[22] Filed: Mar. 5, 1991

[51] Int. Cl.$^5$ .................................................. G21C 7/14
[52] U.S. Cl. ............................. 376/232; 376/235; 376/242
[58] Field of Search ................. 376/242, 232, 235, 226

[56] References Cited

U.S. PATENT DOCUMENTS

| | | | |
|---|---|---|---|
| 2,080,544 | 5/1937 | Naugler | 192/148 |
| 3,278,385 | 10/1966 | Dufrane | 376/232 |
| 3,410,381 | 11/1968 | Henshaw et al. | 192/148 |
| 3,785,923 | 1/1974 | Bratoljic et al. | 376/227 |
| 3,945,514 | 3/1976 | Dose | 214/27 |
| 4,015,696 | 4/1977 | Lichti | 188/189 |
| 4,238,288 | 12/1980 | Anikin et al. | 376/232 |
| 4,293,381 | 10/1981 | Goetzmann et al. | 376/232 |
| 4,423,002 | 12/1983 | Wiart et al. | 376/227 |
| 4,624,825 | 11/1986 | Martin et al. | 376/227 |
| 4,661,307 | 4/1987 | Guillot | 376/232 |

Primary Examiner—Brooks H. Hunt
Assistant Examiner—Frederick H. Voss
Attorney, Agent, or Firm—Robert R. Shroeder

[57] ABSTRACT

A latch assembly is disclosed for selectively preventing rotation of a shaft, such as a shaft used in a control rod drive for a nuclear reactor. The latch assembly includes a stationary housing for receiving the shaft, and a gear fixedly joined to the shaft. A latch arm is pivotally joined to the housing and includes at least one latch tooth facing gear teeth extending from the gear. The latch arm is selectively positionable in an engaged position to abut the latch tooth against a first one of the gear teeth for preventing rotation of the shaft in a first direction, and in a disengaged position to space the latch tooth away from the gear teeth for allowing the shaft to rotate without obstruction between the gear teeth and the latch tooth.

10 Claims, 4 Drawing Sheets

# LATCH ASSEMBLY FOR A CONTROL ROD DRIVE

TECHNICAL FIELD

The present invention relates generally to control rod drives used in nuclear reactors and, more specifically, to a latch assembly effective for preventing rotation of the control rod drive when actuated.

BACKGROUND ART

In one type of nuclear reactor, control rods are selectively inserted and withdrawn from a nuclear reactor vessel for controlling the operation thereof. Each of the control rods is typically positioned by a conventional control rod drive which includes a ball screw or spindle threadingly engaging a ball nut for raising and lowering the ball nut as the spindle is rotated either clockwise or counterclockwise. A hollow piston rests upon the ball nut at one end thereof and at its other end is conventionally joined to the control rod. Displacement of the ball nut provides displacement of the piston which in turn inserts or withdraws the control rod in the reactor vessel.

In order to achieve faster insertion of the control rod than could be obtained by normal rotation of the ball spindle, which is conventionally referred to as a scram operation, a rapid flow of high-pressure water is injected through the control rod drive past the piston for lifting the piston off the ball nut in a relatively short time for quickly inserting the control rod into the reactor vessel. The high-pressure water is channeled to the control rod drive through a scram line pipe attached to a high-pressure water accumulator.

In one type of occurrence which allows for rapid backflow of the water past the piston, due to, for example, a break in the scram line, the backflow may cause a large reverse pressure on the piston which in turn provides a back force on the control rod ball nut. This back force can cause reverse rotation of the ball spindle with corresponding withdrawal of the control rod. Withdrawal of one of the control rods due to such a backflow occurrence may cause damage to adjacent fuel in the reactor vessel, requiring replacement thereof leading to undesirable down time of the reactor and economic losses.

In order to prevent the above occurrence, a conventional electromechanical brake is provided in the control rod drive for holding the ball spindle from rotating unless the brake is energized. The brake is sized for restraining rotation of the ball spindle against such forces due to backflow of water over the piston when the control rod drive motor is not operating. And, when the control rod drive motor is operating, the motor itself is sized for providing adequate torque for resisting the forces due to the backflow of water in the event of the above-described occurrence.

To ensure operability of the brake, the brake is periodically tested. However, the brakes are located adjacent to the reactor vessel, which is inaccessible during operation of the reactor due to the radiation field emanating from the reactor vessel. The radiation field continues at reduced levels also during shutdown of the reactor, which would require inspectors to wear suitable protective clothing and limit their time in the area. In one nuclear reactor embodiment, there are about 205 control rod drives, including a respective number of brakes, which would necessarily require a substantial amount of time for testing all of the brakes. Testing of the brakes during reactor shutdown would, therefore, be relatively costly to accomplish, which is additionally economically undesirable since the reactor is not operating for producing power.

Since conventional electromechanical brakes typically utilize braking pads for restraining rotation of a rotor disc, they are subject to slippage. Slippage can result in undesirable partial withdrawal of the control rod during backflow occurrence, and also requires additional means for effectively testing the torque-resisting capability of the brake.

OBJECTS OF THE INVENTION

Accordingly, one object of the present invention is to provide a new and improved latch assembly for preventing rotation of a shaft.

Another object of the present invention is to provide a latch assembly effective for providing a positive rotational restraint of the shaft.

Another object of the present invention is to provide a relatively simple and compact latch assembly for a shaft.

Another object of the present invention is to provide a latch assembly which is relatively easily testable.

Another object of the present invention is to provide a latch assembly for preventing rotation of a control rod drive for a nuclear reactor and which may be actuated and tested remotely therefrom.

DISCLOSURE OF INVENTION

A latch assembly is disclosed for selectively preventing rotation of a shaft, such as a shaft used in a control rod drive for a nuclear reactor. The latch assembly includes a stationary housing for receiving the shaft, and a gear fixedly joined to the shaft. The gear includes a plurality of circumferentially spaced gear teeth. A latch arm is pivotally joined to the housing and has at least one latch tooth facing the gear teeth. Means are provided for selectively positioning the latch arm in an engaged position wherein the latch and gear teeth prevent rotation of the shaft in a first direction, and in a disengaged position for allowing the shaft to rotate without obstruction between the gear teeth and the latch tooth.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
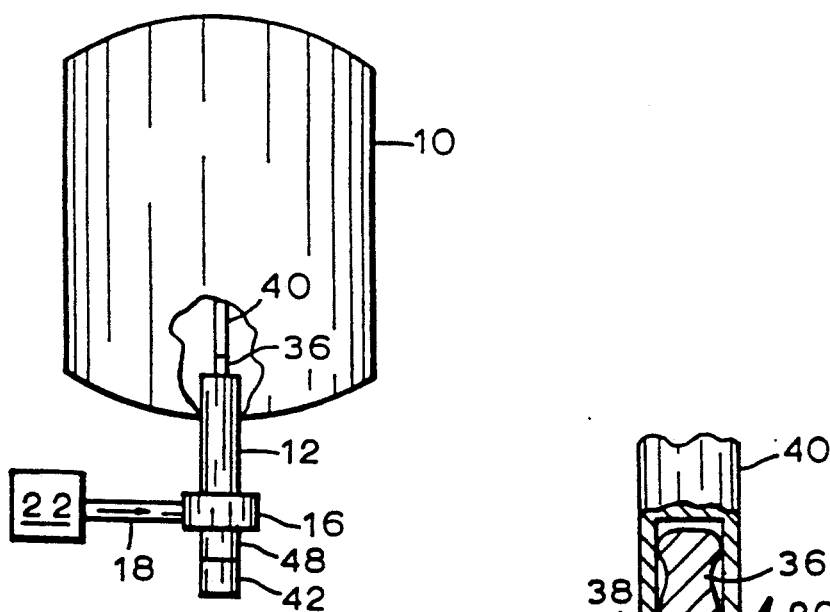
FIG. 1 is a schematic representation of a nuclear reactor vessel including a control rod drive having a latch assembly in accordance with one embodiment of the present invention.
Figure 2:
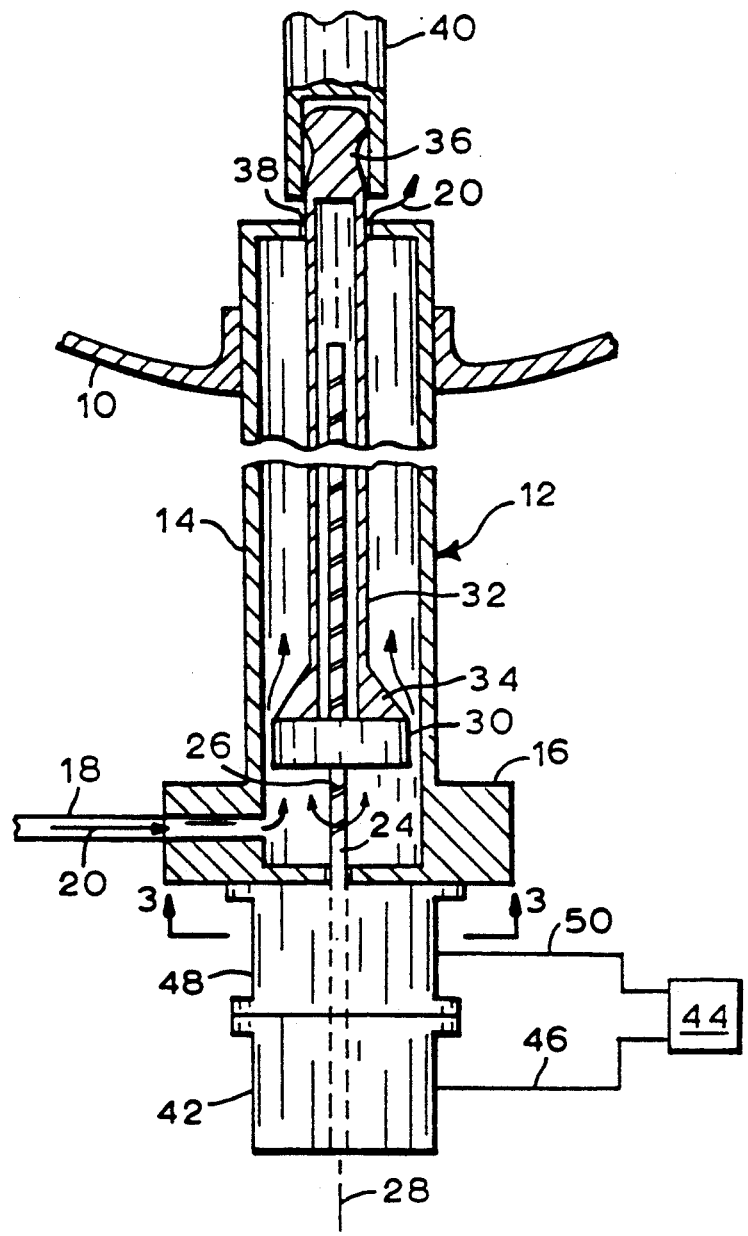
FIG. 2 is an enlarged sectional view, partly schematic, of the control rod drive illustrated in FIG. 1.

Illustrated in FIG. 1 is an exemplary nuclear reactor vessel 10 having a plurality of fine motion control rod drives 12 (FMCRD), only one of which is shown. In one exemplary embodiment, there are 205 FMCRDs 12 extending into the vessel 10 through the bottom thereof. Referring also to FIG. 2, an enlarged, sectional view of one of the control rod drives 12 is illustrated. The rod drive 12 includes a tubular housing 14 extending outwardly from the vessel 10 and conventionally secured thereto. The housing 14 is conventionally connected to a flange or manifold 16 which is disposed in flow communication with a scram line or conduit 18 which is conventionally selectively provided with high-pressure water 20 from a conventional high-pressure water accumulator 22 conventionally joined to the scram line 18.

Conventionally disposed inside the housing 14 is a conventional ball screw or spindle 24, which in this exemplary embodiment includes conventional right-handed threads 26. The control rod drive 12 includes a longitudinal centerline axis 28, with the housing 12 and spindle 24 being disposed coaxially therewith.

A conventional ball nut 30 is positioned over the spindle 24 and is conventionally restrained from rotating therewith so that as the spindle is rotated in a clockwise direction, the ball nut is translated in a downward direction away from the vessel 10, and when the spindle is rotated in a counterclockwise direction, the ball nut 30 is translated in an upward direction toward the vessel 10. A conventional hollow, elongate piston 32 is disposed coaxially with the spindle 24 and includes a conical base end 34 which rests on the ball nut 30, and a tip end 36 extending through a central aperture 38 in the outer end of the housing 14 into the vessel 10. The tip end 36 is conventionally coupled to a respective control rod 40 by a bayonet coupling, for example.

The spindle 24 extends downwardly from the manifold 16 through a conventional electrical motor 42 which selectively rotates the spindle 24 in either the clockwise direction or counterclockwise direction. The motor 42 is electrically connected to a conventional control 44 by a conventional electrical line 46 for selectively controlling operation of the motor 42.

In accordance with the preferred embodiment of the present invention, the rod drive 12 further includes a latch assembly 48 joined between the manifold 16 and the motor 42, into which assembly 48 extends the spindle 24, also referred to as an input shaft 24. The latch assembly 48 is electrically joined to the control 44 by a conventional electrical line 50 for selectively locking and unlocking, or releasing, the input shaft 24.

Figure 3:
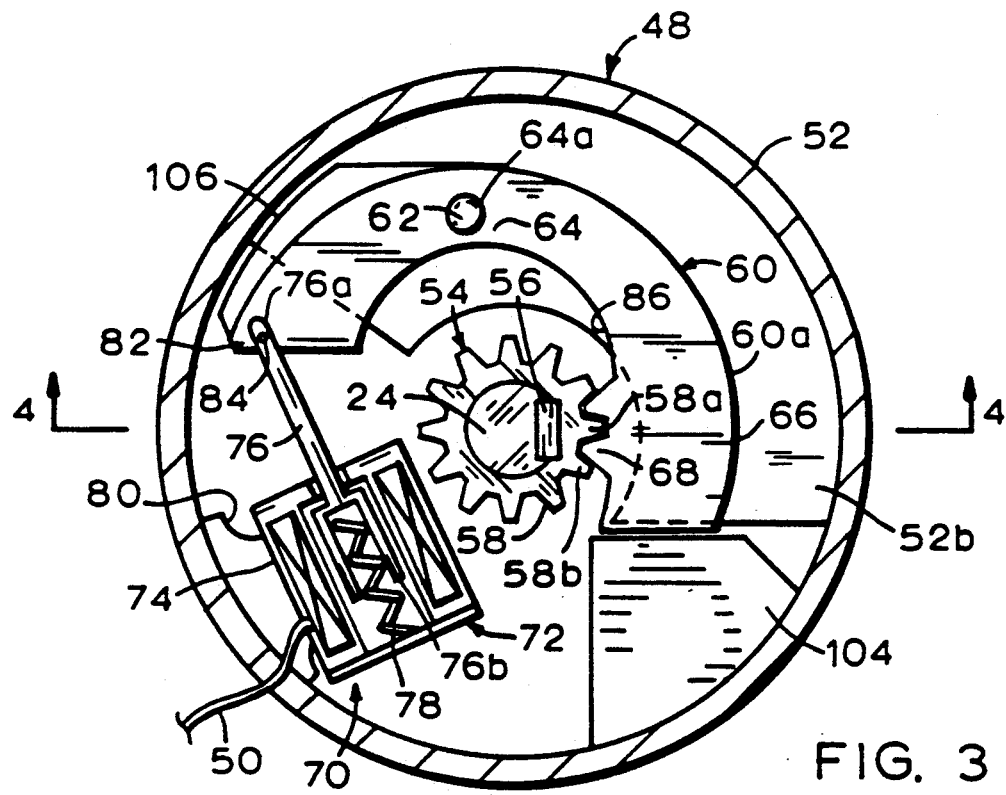
FIG. 3 is a transverse sectional view of the latch assembly illustrated in FIG. 2 taken along line 3—3, shown in an engaged position, in accordance with one embodiment of the invention.
Figure 4:
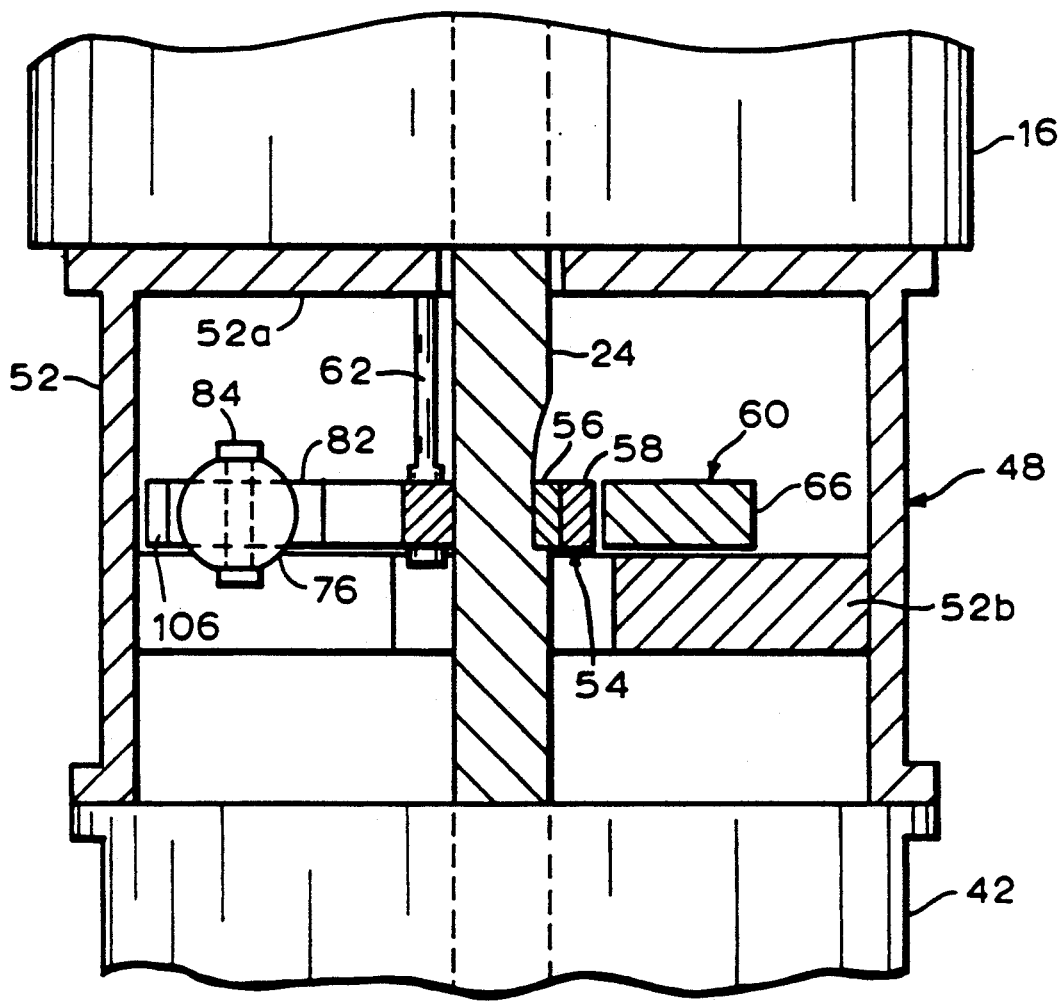
FIG. 4 is a longitudinal sectional view of the latch assembly shown in FIG. 3 taken along line 4—4.

Illustrated in more particularity in FIGS. 3 and 4 is the latch assembly 48 which includes a tubular housing 52 conventionally fixedly joined to the manifold 16, and to which housing 52 is also conventionally fixedly joined the motor 42 therebelow. The housing 52 surrounds a portion of the shaft 24 which extends from the manifold 16 and to the motor 42. A gear 54 is conventionally fixedly joined to the shaft 24, by a key 56 for example, for rotation therewith. The gear 54 includes a plurality of circumferentially spaced gear teeth 58.

A latch arm 60 is conventionally pivotally joined to the housing 52 which, in an exemplary embodiment, is accomplished by a conventional pin 62. The pin 62 extends from an annular flange plate 52a of the housing 52, generally parallel to the shaft 24, and into a pivot hole 64a of an intermediate portion 64 of the latch arm 60. The latch arm 64 is slidably supported on a slide plate 52b which is disposed parallel thereto and fixedly joined to the housing 52. The slide plate 52b additionally supports the latch arm 64 as the arm 64 is pivoted about the pin 62.

In alternate embodiments, the intermediate portion 64 could include, for example, a pin formed integrally therewith and received in a complementary hole in the flange plate 52a or the slide plate 52b.

The latch arm 60 also includes a first end 66 having at least one latch tooth 68 facing the gear teeth 58. Although one latch tooth 68 is required, a plurality of latch teeth 68 may be used for redundancy.

Figure 5:
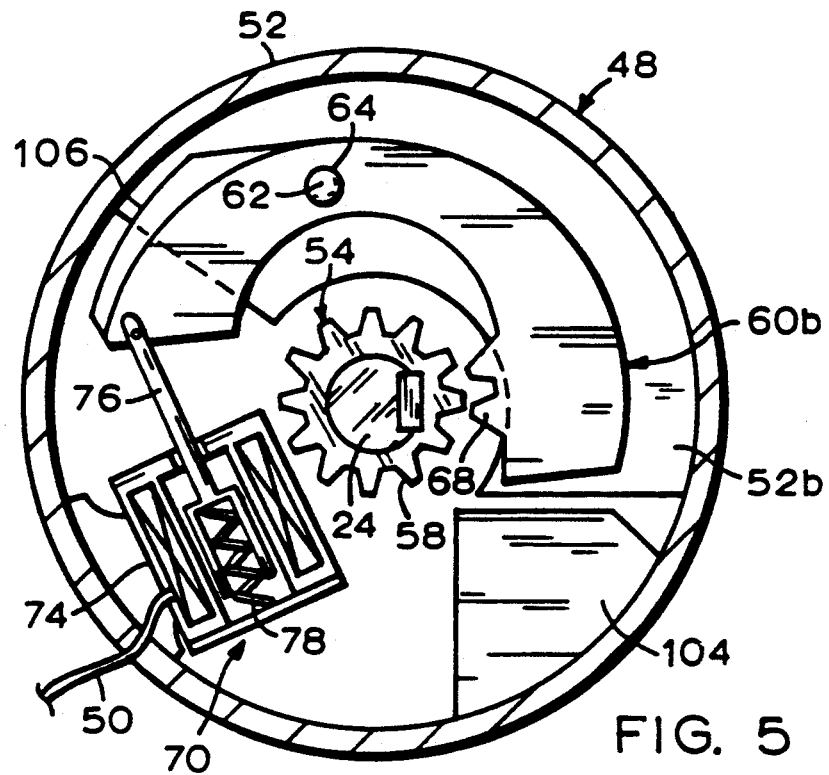
FIG. 5 is a transverse sectional view of the latch assembly as illustrated in FIG. 3 shown in a disengaged position.

As illustrated more particularly in FIG. 3, means designated generally 70 are provided for selectively pivoting or positioning the latch arm 60 about its intermediate portion 64 in either of an engaged position designated 60a (as shown in FIG. 3) or a disengaged position 60b (as shown in FIG. 5). In the engaged position 60a, the latch arm 60 is positioned to abut the latch tooth 68 against a first one 58a of the gear teeth 58 for preventing rotation of the shaft 24 in a first, or clockwise, direction. In the disengaged position illustrated in FIG. 5, the positioning means 70 are effective to space the latch tooth 68 away from the gear teeth 58 for allowing the shaft 24 to rotate without obstruction between the gear teeth 58 and the latch tooth 68.

Figure 6:
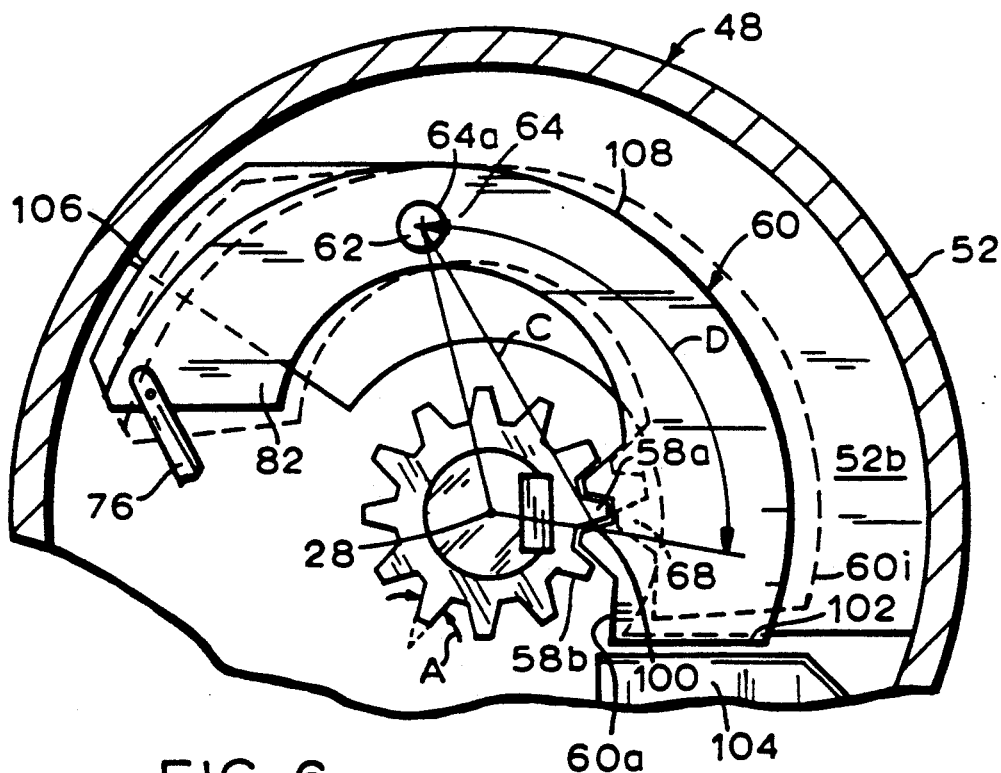
FIG. 6 is a enlarged transverse sectional view of a portion of the latch assembly illustrated in FIG. 3.

In the preferred embodiment of the invention, the positioning means 70 are effective for allowing rotation of the shaft 24 in a second, counterclockwise or opposite, direction to the first direction, to intermittently disengage the latch tooth 68 from the gear teeth 58 while the latch arm 60 is in the engaged position 60a. FIG. 6 illustrates the latch arm 60 in solid line in its engaged position 60a and in dashed line designated 60i at an intermediate position between the engaged position 60a and the disengaged position 60b just at the point wherein the first gear tooth 58 is being rotated past the latch tooth 68 in the second direction, and succeeded by a next adjacent, or second, gear tooth 58b.

Referring again to FIG. 3, the positioning means 70 in accordance with a preferred and exemplary embodiment of the present invention includes a conventional electromagnet 72 having a conventional solenoid 74 and conventional, axially slidable plunger 76 therein, and a conventional compression spring 78 disposed inside the plunger 76 and inside the solenoid 74. The solenoid 74 is conventionally fixedly joined to the housing 52 by a solenoid base 80. The plunger 76 extends from the solenoid 74 and has a distal end 76a conventionally pivotally joined to a second end 82 of the latch arm 60, for example by a second pin 84 extending through the distal end 76a and the latch arm second end 82.

The plunger 76 includes a tubular proximal end 76b inside the solenoid 74 into which is positioned the spring 78. The spring 78 is predeterminedly initially compressed in the solenoid 74 to resiliently bias the plunger 76 to an extended position when the solenoid 74 is deenergized for positioning the latch arm 60 in the engaged position 60a. The electrical line 50 is conventionally joined to the solenoid 74 for selectively energizing the solenoid 74 to draw the plunger 76 to a withdrawn position into the solenoid 74 as illustrated in FIG. 5 further compressing the spring 78 for positioning the latch arm 60 in the disengaged position 60b.

In the preferred embodiment, the latch arm 60 is arcuate and includes a generally concave radially inner surface 86, as illustrated in FIG. 3 which faces the gear 54. The latch tooth 68 is disposed on the inner surface 86 at the first end 66 of the latch arm 60. The latch arm second end 82 is on the opposite end of the latch arm 60 with the intermediate portion 64 being disposed therebetween.

As illustrated in FIGS. 3 and 5, when the solenoid 74 is deenergized, the compression spring 78 moves the plunger 76 to its extended position for pivoting the latch arm 60 about its intermediate portion 64 for abutting the latch tooth 68 against the first gear tooth 58a in the latch arm engaged position 60a for preventing rotation of the shaft 24 in the clockwise direction. When the solenoid 74 is energized, the plunger 76 is electromagnetically drawn into the solenoid 74 which pivots the latch arm 60 about its intermediate portion 64 for spacing the latch tooth 68 away from the gear teeth 58 for allowing unobstructed rotation of the shaft 24 in both the clockwise and counterclockwise directions.

There are various embodiments of the latch arm 60 and the positioning means 70 for allowing the latch arm 60 to pivot about its intermediate portion 64 for engaging and disengaging the latch and gear teeth 68, 58. In the preferred embodiment of the present invention, the positioning means 70 are effective for also allowing rotation of the shaft 24 in the second, or counterclockwise, direction to intermittently disengage the latch tooth 68 from the gear teeth 58 while the latch arm 60 is in its engaged position 60a as illustrated in FIG. 6. This ensures that should the latch arm 60 remain engaged for any reason, the shaft 24 may nevertheless be rotated in its counterclockwise direction for inserting the control rod 40 further into the vessel 10.

Figure 7:
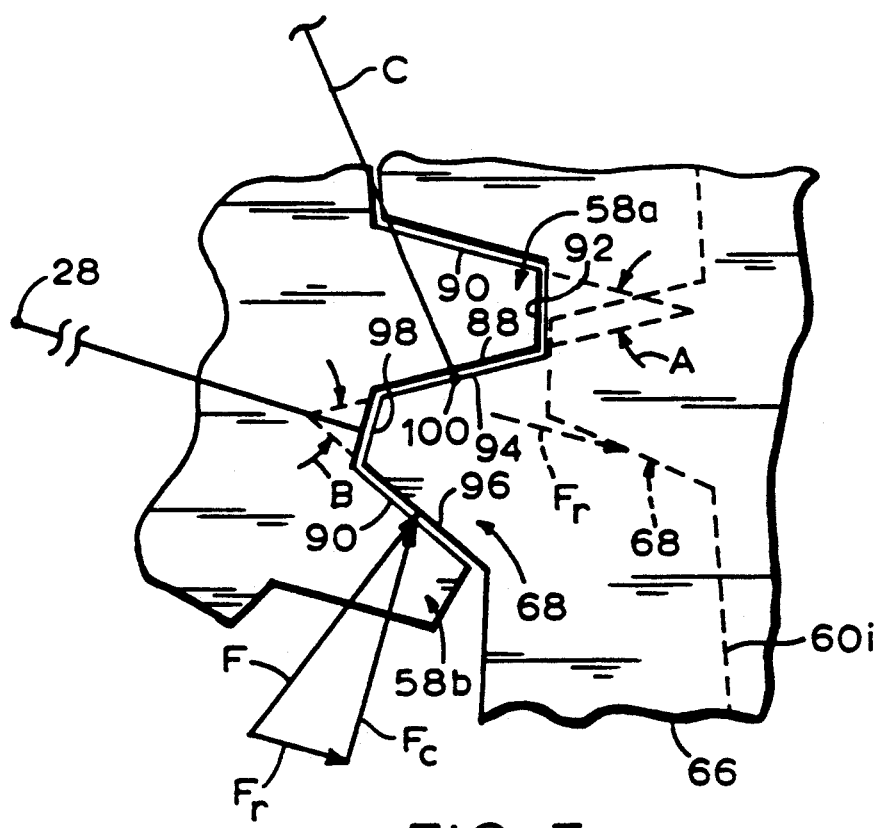
FIG. 7 is an enlarged transverse sectional view of the mating gear and latch teeth of the latch assembly illustrated in FIG. 6.

More specifically, and referring to FIGS. 6 and 7, a preferred embodiment for allowing the intermittent disengagement of the latch tooth 68 and the gear teeth 58 while the latch arm 60 is in its engaged position 60a is illustrated. FIG. 7 shows an enlarged view of the first gear tooth 58a engaged with the latch tooth 68. Each of the gear teeth 58 includes a first contact surface 88, and a second, opposite, contact surface 90 which extend radially outwardly from the gear 54 and are joined together at a transverse top surface 92. The latch tooth 68 has a first contact surface 94 and a second, opposite, contact surface 96 extending outwardly from the latch arm first end 66 which are joined together at a transverse top surface 98. The latch tooth 68 is preferably complementary in configuration with the gear teeth 58 so that the first gear tooth first contact surface 88 abuts the latch tooth first contact surface 94 in the latch arm engaged position 60a. In this way, the gear 54 is prevented from rotating in the clockwise direction by contact between the first contact surfaces 88 and 94.

Various configurations of the latch arm 60 and the gear and latch teeth 58, 68 are within the scope of the present invention for both preventing clockwise rotation of the gear 54 while allowing intermittent counterclockwise rotation of the gear 54 while the latch arm 60 is in its engaged position 60a. The latch arm intermediate portion 64 about which the latch arm 60 is pivotable, and the latch tooth 68 are preferably positioned relative to the first gear tooth 58a so that a straight chord C defined between the intermediate portion 64 (e.g. center of pin 62) and the latch tooth first contact surface 94, as illustrated in FIGS. 6 and 7, elongates to oppose rotation of the shaft 24 in the clockwise direction when the latch arm 60 is in its engaged position 60a. This elongation is merely the conventional elastic extension of the latch arm 60 as measured along the chord C due to the application of tensile loads imposed by the first gear tooth 58a on the latch tooth 68. In the preferred embodiment of the present invention, the gear teeth 58 and the latch tooth 68 are complementary in configuration and each includes an acute angle between the respective contact surfaces thereof, A and B, respectively. The included angles A and B are about equal to 40° in one embodiment. Furthermore, contact of the first gear tooth 58a with the latch tooth 68 occurs generally about a contact point 100 and the included angle D between lines drawn between the centerline 28 and the contact point 100 and the latch arm intermediate portion 64 is about 110° in the preferred embodiment. Of course, various relative positions between the latch arm intermediate portion 64, gear teeth 58, and latch teeth 68 may be used to ensure effective prevention of clockwise rotation of the gear 54.

In accordance with another feature of the present invention, the latch tooth second contact surface 96, as more particularly illustrated in FIG. 7, is preferably positioned relative to the second contact surface 90 of the adjacent, or second, gear tooth 58b in the latch arm engaged position 60a so that rotation of the shaft 24 in the counterclockwise direction causes the second gear tooth contact surface 90 to push the latch tooth 68 radially away from the gear 54 to intermittently disengage the latch tooth 68 from the gear teeth 58. As shown in FIG. 7, the second gear tooth 58b imposes a resultant force F against the latch tooth second contact surface 96 when the shaft 24 is rotated in the counterclockwise direction. Since the gear teeth 58 and the latch tooth 68 have inclined contact surfaces 90, 96 due to the included angles A and B, respectively, the resultant force F may be resolved into two component forces $F_c$ and $F_r$, wherein $F_r$ is a radially outwardly directed force upon the latch tooth 68. The radial force $F_r$ pushes the latch arm first end 66 away from the gear 54 to pivot the latch arm 60 about the intermediate portion 64. However, this motion is being opposed by the compression spring 78 which is in its extended position as illustrated in FIG. 3. The spring 78 has a predetermined spring constant which allows counterclockwise rotation of the shaft 24 to push the latch tooth 68 away from the second gear tooth 58b. As shown in dashed line in FIG. 7, and designated 60i, the latch arm 60 is pushed away from the gear 54 by the counterclockwise rotation thereof until the first gear tooth 58a is allowed to rotate past the latch tooth 68 at which time, the spring 78 is effective for returning the latch arm 60 to its fully engaged position 60a abutting the next succeeding gear tooth, e.g. 58b. This process of intermittently freeing a gear tooth 58 continues until counterclockwise rotation of the shaft 24 ceases.

Accordingly, the preferred cooperation between the latch arm 60 and the gear 54 results in a ratcheting action between the gear teeth 58 and the latch tooth 68 which prevents rotation of the shaft 24 in a clockwise direction while allowing rotation in the counterclockwise rotation while the latch arm 60 is in its engaged position 60a.

The latch assembly 48 preferably also includes an aft surface 102 on the latch arm first end 66 as illustrated in FIG. 6. Furthermore, a stop member 104 is conventionally fixedly joined to the housing 52 and is positioned adjacent to the latch arm aft surface 102 so that rotation of the shaft 24 in the clockwise direction is opposed by wedging of the latch arm aft surface 102 against the stop member 104 in the latch arm engaged position 60a. The stop member 104 provides an additional means for ensuring that clockwise rotation of the shaft 24 is prevented when the latch arm 60 is positioned in its engaged position 60a.

Over an extended period of time of operation of the latch arm 60, wear between the pin 62 and the latch arm hole 64a may occur which would allow for additional movement of the latch arm 60 relative to the pin 62. In order to ensure effective restraint of the shaft 24 when the latch arm 60 is in its engaged position 60a, an additional arcuate stop portion 106 is preferably provided on the convex outer surface 108 of the latch arm 60 at its second end 82 as illustrated in FIG. 6. The stop portion 106 is preferably disposed closely adjacent to the housing 52 in the latch arm engaged position 60a for contacting the housing 52 upon predetermined wear of the latch arm intermediate portion 64, e.g. wear of the pin 62 and hole 64a. After a predetermined amount of wear of the intermediate portion 64, the stop portion 106 will contact the housing 52 in the latch arm engaged position 60a for maintaining engagement between the latch tooth 68 and the first gear tooth 58a. Without the stop portion 106, sufficient wear of the intermediate portion 64 would allow for translation movement of the latch arm 60 which might prevent proper engagement of the latch tooth 68 and the gear teeth 58. The stop portion 106 will limit the ability of the intermediate portion 64 to move radially outwardly away from the pin 62, and relative to the centerline axis 28, and, thereby, ensure the effective engagement of the latch tooth 68 and the gear teeth 58.

In the preferred embodiments of the invention disclosed above, the solenoid 74 is first energized to disengage the teeth 58 and 68, then the motor 42 is energized, e.g. at a fraction of a second later, during normal operation to allow the motor 42 to rotate the shaft 24 for positioning the control rod 40 without obstruction by the latch assembly 48. Upon completion of the desired rotation of the motor 42 and positioning of the control rod 40, the motor 42 is deenergized and stopped, and then the solenoid 74 is deenergized so that the latch arm 60 engages the gear 54. If the shaft 24 then begins to unintentionally rotate, such as for example by the backflow occurrence described above, the shaft 24 will be prevented from rotating in the clockwise direction by engagement of the latch tooth 68 and the first gear tooth 58a. The latch arm 60, therefore, provides a positive lock of the shaft 24 to prevent undesirable rotation thereof, including unintentional withdrawal of the control rod 40 from the reactor vessel 10.

The latch assembly 48 as described above provides a positive lock of the shaft 24 to prevent ejection of the control rod 40 from the vessel 10 and allows for relatively simple testing of the latch assembly 48 itself. More specifically, the assembly 48 may be simply tested by deenergizing the solenoid 74 for engaging the latch arm 60 with the gear 54 and then energizing the motor 42 for rotating the shaft 24 in a clockwise direction for forcing the first gear tooth 58a against the latch tooth 68. Since the motor 42 will be unable to rotate the first gear tooth 58a past the latch tooth 68 in the clockwise direction, the motor 42 will stall, which may be conveniently observed by the control 44 for indicating the effective operation of the latch assembly 48. If the latch assembly 48 is unable to prevent clockwise rotation of the shaft 24 during testing, the control 44 can provide a suitable indication thereof, which will then result in manual inspection of the latch assembly 48 for correcting any problem that might exist.

In the preferred embodiment of the invention as described above, the latch assembly 48 is positioned between the manifold 16 and the motor 42. Accordingly, the motor 42 may be removed during maintenance, and the latch assembly 48 may be deenergized to prevent clockwise rotation of the shaft 24 during this maintenance operation. Therefore, the latch assembly 48 can replace or duplicate the function of any existing antirotation mechanism which is located between the manifold 16 and the motor 42.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

For example, the gear teeth 58 and latch tooth 68 need not be symmetrical since they have two functions, i.e. preventing clockwise while allowing intermittent counterclockwise rotation of the shaft 24 in the latch arm engaged position 60a. Accordingly, in an alternate embodiment, the first contact surfaces 00, 94 could be aligned along a radial axis from the centerline 28, while the second contact surfaces 90, 96 could remain at an inclined angle thereto.

Accordingly, what is desired to be secured by Letters Patent of the United States is the invention as defined and differentiated in the following claims:

I claim:

1. A control rod drive for positioning a control rod in a nuclear reactor vessel comprising:

a shaft;

a ballnut positioned over said shaft and being translatable upon rotation of said shaft;

a piston disposed coaxially with said shaft and on said ballnut for positioning said control rod;

means for selectively rotating said shaft in a first direction and in a second direction, opposite to said first direction;

a housing surrounding a portion of said shaft;

a gear fixedly joined to said shaft, said gear having a plurality of circumferentially spaced gear teeth;

a latch arm pivotally joined to said housing, and having at least one latch tooth facing said gear teeth; and means for selectively positioning said latch arm in an engaged position to abut said latch tooth against a first one of said gear teeth for preventing rotation of said shaft in said first direction, and in a disengaged position to spaced said latch tooth away from said gear teeth for allowing said shaft to rotate without obstruction between said gear teeth and latch tooth for translating said ballnut and in turn said piston for inserting and withdrawing said control rod in said reactor vessel.

2. A control rod drive according to claim 1 wherein said positioning means are effective for allowing rotation of said shaft in said second direction by said rotating means to intermittently disengage said latch tooth from said gear teeth while said latch arm is in said engaged position.

3. A control rod drive according to claim 2 wherein said positioning means include an electromagnet having a solenoid, plunger, and spring, said solenoid being fixedly joined to said housing, said plunger extending from said solenoid and pivotally joined to said latch arm, and said spring being disposed in said solenoid to resiliently bias said plunger to an extended position when said solenoid is deenergized for positioning said latch arm in said engaged position, and said solenoid being energizable to draw said plunger to a withdrawn position for positioning said latch arm in said disengaged position.

4. A control rod drive according to claim 2 wherein said latch arm includes:
 a first end including said latch tooth;
 an intermediate portion pivotally joined to said housing; and
 a second end, opposite to said first end, joined to said positioning means.

5. A control rod assembly according to claim 4 wherein said latch arm is arcuate and includes a concave inner surface facing said gear, and said latch tooth is disposed on said inner surface.

6. A control rod assembly according to claim 5 wherein:
 each of said gear teeth has a first contact surface and a second, opposite, contact surface;
 said latch tooth has a first contact surface and a second, opposite, contact surface; and
 said latch tooth and said gear teeth being complementary in configuration so that said first gear tooth first contact surface abuts said latch tooth first contact surface in said latch arm engaged position.

7. A control rod drive according to claim 6 wherein said latch arm intermediate portion and said latch tooth are positioned relative to said first gear tooth so that said latch tooth first contact surface opposes rotation of said shaft in said first direction when said latch arm is in said engaged position due to tensile loads imposed by said first gear tooth on said latch tooth affecting elastic extension of said latch arm.

8. A control rod drive according to claim 6 wherein said latch tooth second contact surface is positioned relative to a second contact surface of a second gear tooth disposed adjacent to said first gear tooth in said latch arm engaged position so that rotation of said shaft in said second direction by said rotating means causes said second gear tooth second contact surface to push said latch tooth radially away from said gear to intermittently disengage said latch tooth from said gear teeth.

9. A control rod drive according to claim 6 further including:
 said latch arm including an aft surface at said first end;
 a stop member fixedly joined to said housing and positioned adjacent to said latch arm aft surface so that rotation of said shaft in said first direction is opposed by wedging of said latch arm aft surface against said stop in said latch arm engaged position.

10. A control rod drive according to claim 6 wherein said arcuate latch arm includes a convex outer surface having a stop portion at said latch arm second end disposed adjacent to said housing in said latch arm engaged position for contacting said housing upon predetermined wear of said latch arm intermediate portion for maintaining engagement between said latch tooth and said first gear tooth.

* * * * *